United States Patent Office 2,918,387
Patented Dec. 22, 1959

2,918,387

BONDING OF PERHALOGEN POLYMERS TO METALLIC SUBSTRATES

William M. Wooding, Old Greenwich, Conn., assignor to American Cyanamid Company, New York, N.Y., a corporation of Maine No Drawing. Application June 11, 1956
Serial No. 590,792

6 Claims. (Cl. 117—49)

The present invention relates to the formation of adherent coatings of thermoplastic perhalogen vinyl polymers on substrate materials. More particularly, the present invention relates to a method for improving the adhesion of such polymers to metal surfaces by pretreating the metal as hereinafter described, followed by application of the polymer in fused or molten form.

The perhalogen vinyl polymers represented by polytetrafluoroethylene, polytrifluorochloroethylene, etc. are recent discoveries. These polymers are unique in numerous particulars. First, they are chemically inert, being unaffected by practically all aqueous acids, aqueous alkalis, and organic solvents. Then they are thermoplastic but highly resistant to fusion, generally remaining solid at temperatures up to about 350° C. They are thermostable, so that they can be heated considerably higher without decomposition. The polymers are waxy in character, resistant to abrasion, and are pliable and elastic even at 0° C. or lower temperatures.

A most unusual property of the polymers is that their surfaces tend to be self-lubricating and slippery, and refuse to adhere to practically all known substances including substances which are generally regarded as adhesives; cf. U.S. Patent No. 2,230,654. The principal commercial utility of the polymers is thus as valve glands, journal and other bearing material, and rollers for processing very sticky materials such as bread dough, candy, tar, and rubber compounds. In the field of sports the polymers are employed as ski-bottoms, where their lack of adhesion for wet snow gives high speed under normally unfavorable snow conditions.

The polymers are generally formed by polymerizing the tetrahalogen ethylenes, the products being perhalogen vinyl polymers, i.e., linear carbon chain polymers wherein substantially all extra-chain carbon valences are satisfied by halogen atoms, so that the polymers are substantially free from hydrogen.

The usefulness of perhalogen vinyl polymers has been seriously impaired by the fact that so far it has not been possible to satisfactorily bond them to substrate materials except perhaps by the use of elaborate procedures; cf. U.S. Patent No. 2,736,680. Such polymer-metal combinations, however, are in demand as corrosion- and solvent-resistant materials for the fabrication of chemical reactors, mixers, piping, etc.

The discovery has now been made that the adhesion of perhalogen vinyl polymers for metals can be improved by first adsorbing a small amount of a nitrogen base compound on the metal surface, and then coating the metal with the polymer in molten form so as to effect complete and uniform contact between the polymer and the treated surface, after which the surface may be cooled.

Additional improvement in anchoring usually results when excess or unadsorbed polymer is removed prior to application of the perhalogen polymer and this is an important feature of the invention. This excess is most conveniently removed by washing the surface, and water or an organic solvent may be employed. Where the surface has been treated with nitrogen polymer it is preferable that the washing step be performed promptly without intermediate drying of the surface, intermediate drying often decreasing the improvement otherwise obtainable. The washing may be and advantageously is prolonged to ensure complete removal of any unadsorbed material present, and five minutes is usually not too long. Weighings on sensitive laboratory balances indicate that best anchoring of the polymer does not require a layer of nitrogen base even 25 molecules thick and that effective anchoring occurs even when the anchoring agent is in the form of isolated substantially monomolecular clumps.

The nitrogen base compound may be deposited on the metal in a number of ways, and the particular means employed is not a primary feature of the invention.

The nitrogen base may be adsorbed by washing, swabbing or otherwise contacting the metal substrate material with a dilute aqueous or organic solution of the nitrogen base. Preferably the solution is very dilute (in the range of about 0.1–5%). Suitable treating materials which may be applied in this way include non-volatile bases including "A" stage aniline-formaldehyde resin, and thermosetting cationic nitrogen base polymers preferably in partially pre-polymerized or colloidal stage. Among the latter are the cationic resins formed by interreacting an amino material such as urea, thiourea, formoguanamine, ammeline, guanidine and melamine with formaldehyde preferably in the presence of a small amount of a polyalkylenepolyamine or other polyfunctional amino material reactive therewith to solubilize the resin and enhance the cationic properties thereof. Water-soluble polyalkylenepolyamine-epichlorohydrin condensates may be used as the nitrogen base material.

High molecular weight polyalkylenepolyamines may also be employed including polyethylenimine, amines such as correspond to those formed by condensing materials such as ethylenedichloride with 3,3'-iminobispropylamine, and the linear carbon chain polymers represented by polyvinylamine and polyvinylpyridine. The nitrogen base materials may be employed as their free bases or as salts, as most convenient. From the foregoing it is evident that any water-soluble organic or inorganic proton donor may be used. For reasons of convenience the water-soluble nitrogen compounds are preferred, but good results have been obtained using aniline applied from benzene solution from which it appears that water-insoluble compounds are useful.

The nitrogen base materials are rapidly adsorbed by the surface to which they are applied. The contact time may be extended so that the adsorptive capacity of the surface is substantially satisfied, and contact times of about one minute in the case of liquids and about one hour in the case of gases. As shown below, however, mere traces of the anchoring agents are often enough, and therefore shorter contact times appear feasible so that saturation is not requisite.

When the surface is treated by the solution method, the bonding effect produced tends to level off or is even decreased when the concentration of the nitrogenous material in the solution is in excess of about 5% by weight.

Even when 5% solutions are used and the contact time is extended until the adsorptive capacity of the surface is substantially satisfied, the amount of nitrogenous material deposited is very slight, the amount depending chiefly on the particular metal and the particular nitrogenous material employed. Only a trace of nitrogenous material on the surface is needed to produce a substantial bonding effect, and perceptible benefit has been obtained by use of solutions containing as little as 0.01% of the nitrogenous base so that apparently there is no amount however small which is not advantageous. In practice we find that peak economic results are generally obtained when the concentration of nitrogen base in the solution is within the range of about 0.1%–1%.

The perhalogen polymer may be applied to the metal in any convenient way. One suitable method employs the polymer in the form of a fluid aqueous dispersion for example as shown in U.S. Patent No. 2,662,065. According to this method the metal is "painted" with the dispersion, after which the surface is heated to drive off water, dispersing agents etc., and until a thin film or layer of molten polymer forms thereover. Considerable heat is needed as the softening points of the polymers are in excess of about 300° C. The film may be built up to a layer by flowing molten polymer over the initial molten film, with or without intermediate cooling.

Alternatively, the polymer may be applied in the form of a film of foil and hot pressed onto the metal at a temperature above its softening point so that it is fused thereon. The thickness of the film may be built up by hot-pressing additional thin film of polymer.

A thick layer of polymer may be applied by heating the metal surface to the softening point of the polymer and pressing a thick solid sheet of polymer thereon so as to cause the polymer to fuse, the bulk of the polymer however remaining solid. Other suitable methods may be devised, and the particular method employed is not a feature of the invention.

The evidence is that the most permanent bonding is usually afforded as the molecular weight of the nitrogen base compound increases, the lower molecular weight compounds, while generally initially as effective as the polymers, tending to give fugitive results perhaps because of their volatility. The high molecular weight compounds may be applied in preformed condition (e.g. polyethylenimine) or applied as a comparatively low polymer such as the colloid of U.S. Patent No. 2,345,543 which is converted to high molecular form by drying on the metal. The fugitive effects referred to above start to disappear when the polymer has a molecular weight of roughly 1,000, and polymers having molecular weights in excess of 10,000 are usually still better. The maximum molecular weight is governed by convenience of application. As low-molecular weight materials which convert to high molecular weight form upon application followed by aging or treatment with heat there may be used the thermosetting cationic amino-aldehyde condensates referred to above. These condensates convert to high molecular weight hydrophobic form, if not previously converted, during the heating and drying of the surface prior to or during the heating incident to forming the layer of molten polymer.

It is surprising that an effective amount of polymer remains oven though the metal surface is washed thoroughly after pretreatment and then heated to 300° C.. with access of air.

The invention will be further illustrated by the examples which are embodiment and are not to be construed as limitations thereon.

*Examples 1–4*

The bonding of perhalogen vinyl polymers to steel and aluminum according to the present invention is illustrated as follows.

Cationic nitrogen base condensates were prepared as follows for use as bonding agents.

(1) *Methylol-carbamyl-polyazaalkane polymer.*—This polymer was prepared by reacting 53.1 parts of 3,3′-iminobispropylamine ("IBPA") with 31.7 parts of 1,2-dichloroethane and 20.2 parts of water at up to 75° C. and then at reflux to form a polyazaalkane of maximum practicable chain length. To the mixture, cooled to 35° C., was added 81.2 parts of water, 65.4 parts of 32% hydrochloric acid and 104 parts of potassium cyanate to introduce carbamyl groups. The mixture was reacted at 70°–75° C. for 30 minutes. To this condensate was added 197.1 parts of aqueous formaldehyde and 111.9 parts of water and the mixture reacted for 90 minutes at 70° C. The mixture was then cooled and 335.4 parts of water added.

(2) *Melamine - formaldehyde - iminobispropylamine resin.*—This resin was prepared by reacting 252 g. melamine, 1620 g. of 37% formaldehyde, and 4 g. of triethanolamine at 75° C. for 30 minutes, cooling to 65° C., adding 120 g. of 3,3′-iminobispropylamine and 90 g. of 37.5% aqueous HCl, maintaining the reaction at 70° C. by cooling, and stabilizing the mixture by adding 50 g. of sodium hydroxide and 1300 parts of 37% formaldehyde when the viscosity of the reaction mixture reached I (Gardner-Holdt). The product contained 27% solids.

(3) *Urea - formaldehyde - triethylenetetramine ("TETA") cationic resin.*—This resin was prepared according to the method of Example 1 of Suen et al. U.S. Patent No. 2,554,475.

(4) This polymer was prepared by homopolymerizing ethylenimine and had a molecular weight in excess of 10,000 as estimated from its viscosity.

For the tests bright rolled steel and aluminum laboratory panels 4″ x 6″ were degreased by washing with benzene and treated by dipping half way into aqueous solutions of the resin of the concentration shown in the table below. In the wet treatments the plates were left in contact with the solutions for about one minute. One set of plates was immediately allowed to air-dry, and a duplicate set of plates was washed for three minutes in running water to remove any unadsorbed polymer present and then air-dried.

Polytetrafluoroethylene was employed in the form of a self-sustaining milky aqueous dispersion containing an anionic dispersing agent. Each plate was "painted" with the dispersion which was then heated to evaporate the water and the dispersing agent and to fuse the polymer particles to a continuous molten film. There was full access of air to the plates during the heating. The plates were then cooled to room temperature and tested by drawing a sharp penknife side-ways across the plate so as to scrape a path about 1/16″ wide over the polymer coated surface. Effectiveness of the anchor agent was judged by noting the resistance of the polymer to being scraped away from the plate when the edge of the knife passed from the untreated to the treated portions of the panels.

The anchoring agents were rated on a scale where A designated a very great improvement, B designates a substantial and unmistakeable apparent improvement and C designates substantially no improvement at all, + and − signs being used to designate intermediate values.

Results are shown in the table below.

| Ex. | Resin | | Knife Scratch Test | | | |
| --- | --- | --- | --- | --- | --- | --- |
| | | | Steel | | Aluminum | |
| | Name | Conc., percent | No Wash | Wash | No Wash | Wash |
| 1 | Methylolcarbamyl poly-a-aalkane resin. | 0.5 | C+ | B+ | C+ | B+ |
| 2 | Melamine-IBPI-CH₂O resin | 0.5 | C+ | A | B | B+ |
| 3 | Urea-TEPA-CH₂O resin | 0.5 | A¹ | B−¹ | A | A+ |
| 4 | Polyethylenimine | 0.5 | B− | B+ | A | A+ |

¹ In this instance washing effected no additional improvement.

The values above are comparative, and in each instance are based upon the untreated or control portions of the panels.

These results show that the nitrogen base compounds or proton donors are effective in improving the adhesion of perhalogen polymers to metals and that best results were obtained with the high molecular weight materials.

These results suggest that the adhesion of perhalogen polymers to other heat-resistant substrate material such as ceramics, glass, plastics, brick, etc. may be similarly improved. In the case of wood, bonding may be effected by pre-treating the wood as described and then flash hot pressing a thin film of polymer to the wood to avoid charring the wood.

Without the nitrogen base treatment (i.e., on the untreated portions of the panels) the polytetrafluoroethylene could be easily removed by scraping with a fingernail. The nitrogen base treatment improved adhesion so that removal of the film in this manner usually required very substantial effort.

*Example 5*

The steel plate of Example 2 which had been washed subsequent to treatment with the nitrogen base was heated to above the softening point of the polymer, and drops of molten polymer were allowed to fall on the treated and untreated portions of the plate, after which the plate was cooled and adhesion of the polymer top-coated tested by scraping the drops of polymer with a knife. The adhesion of the polymer drops on the treated portion of the plate was much better than the adhesion of the drops on the untreated portion of the plate, showing that thick layers of anchored polymer can be built up once an anchored initial film of polymer has been deposited.

I claim:

1. A process of forming an adherent coating of normally non-adhesive thermoplastic perhalogen vinyl polymer on a metal surface, which includes the steps of contacting said surface with a dilute solution of a cationic water-soluble organic nitrogen base polymer having a molecular weight in excess of 1,000 thereby adsorbing at least a part of said organic nitrogen polymer on said surface, washing said surface while wet to remove any unadsorbed polymer present, and forming a layer of thermoplastic perhalogen vinyl polymer in molten form thereover.

2. A process according to claim 1 wherein the perhalogen vinyl polymer is polymerized tetrafluoroethylene.

3. A process according to claim 1 wherein the metal surface is steel.

4. A process according to claim 1 wherein the metal surface is aluminum.

5. A process of forming an adherent coating of a normally non-adhesive thermoplastic perhalogen vinyl polymer on a metal surface, which includes the steps of contacting said surface with a dilute solution of a cationic water-soluble organic nitrogen base polymer having a molecular weight in excess of 1,000 thereby adsorbing at least a part of said organic nitrogen polymer on said surface, washing said surface while wet to remove any unadsorbed polymer present, applying an aqueous dispersion of a normally non-adhesive thermoplastic perhalogen vinyl polymer to said surface, and heating said surface to evaporate the water in said dispersion and to fuse said polymer.

6. A process according to claim 5 wherein the solution of the organic nitrogen polymer is an aqueous solution.

References Cited in the file of this patent

UNITED STATES PATENTS

| | | |
|---|---|---|
| 2,593,922 | Robinson et al. | Apr. 22, 1952 |
| 2,668,157 | Emig et al. | Feb. 2, 1954 |
| 2,776,918 | Bersworth | Jan. 8, 1957 |

UNITED STATES PATENT OFFICE
CERTIFICATE OF CORRECTION

Patent No. 2,918,387

December 22, 1959

William M. Wooding

It is hereby certified that error appears in the printed specification of the above numbered patent requiring correction and that the said Letters Patent should read as corrected below.

Column 3, line 53, for "oven" read -- even --; line 56, for "embodiment" read -- embodiments --; column 5, line 16, for "top-coated" read -- top-coat --.

Signed and sealed this 7th day of June 1960.

(SEAL)
Attest:

KARL H. AXLINE
Attesting Officer

ROBERT C. WATSON
Commissioner of Patents